UNITED STATES PATENT OFFICE.

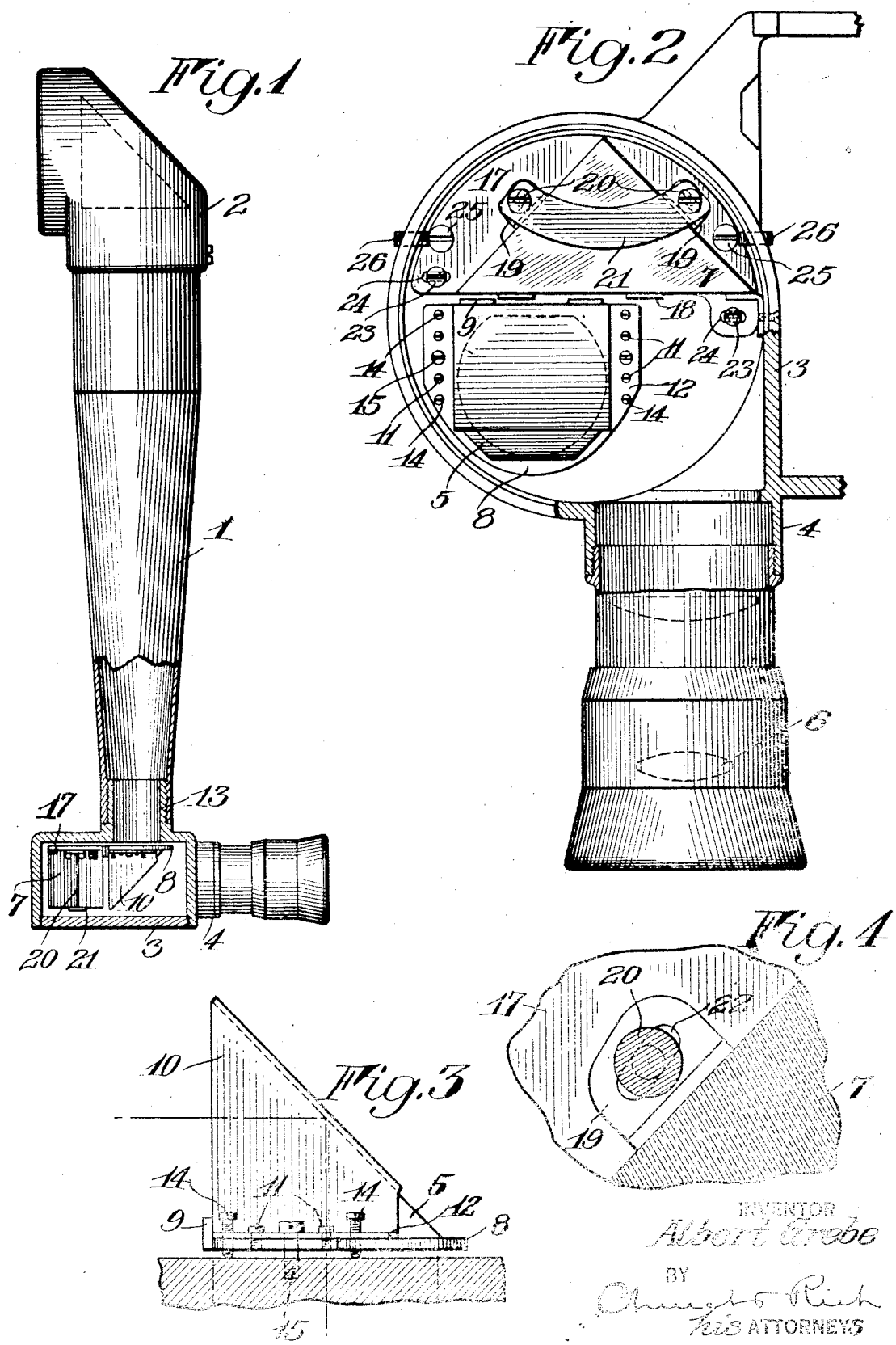

ALBERT GREBE, OF ROCHESTER, NEW YORK, ASSIGNOR TO BAUSCH & LOMB OPTICAL COMPANY, OF ROCHESTER, NEW YORK, A CORPORATION OF NEW YORK.

TELESCOPE-PRISM MOUNTING.

1,308,283.　　Specification of Letters Patent.　　Patented July 1, 1919.

Application filed October 18, 1918. Serial No. 258,727.

*To all whom it may concern:*

Be it known that I, ALBERT GREBE, a citizen of the United States, residing at Rochester, in the county of Monroe, State of New York, have invented certain new and useful Improvements in Telescope-Prism Mountings; and I do declare the following to be a full, clear, and exact description of the same, reference being had to the accompanying drawings, forming a part of this specification, and to the characters of reference marked thereon.

My invention relates to prism telescopes and has for its object to so mount and associate the prisms of the telescope that they may be readily adjusted when collimating the telescope and yet can be so securely fastened that even though the instrument is subjected to severe shocks, stresses or temperature changes the adjustment or setting of the prisms will be maintained.

In the drawings:

Figure 1 is an elevation of the right telescope system of the shears type of telescope parts being broken away to show the ocular prism system and its mounting.

Fig. 2 is an enlarged bottom plan view of the left telescope system of the shears type, the cover of the ocular prism casing being removed to show the prisms and their mountings.

Fig. 3 is a detail of the primary prism showing its mounting and the means for securing it to the casing, and Fig. 4 is a detail sectional view showing the means for adjusting the secondary prism.

Like characters of reference throughout the several figures of the drawings indicate the same parts.

The shears type of telescope in which my invention is embodied comprises generally two complete paired telescope systems connected together by a suitable hinge connection. Each of these telescope systems comprises generally the telescope body tube 1 in which is mounted near its upper end the objective and to the upper end of which is secured a rotatable head housing the objective prism. Secured to the lower end of the body tube 1 is a prism casing 3 provided with a tubular extension 4 to which the ocular 6 is secured.

The ocular prism system housed within the casing 3 consists of a right angle single reflecting prism 5 which for convenience we will call the primary prism because it is the first prism intercepting the path of light from the objective to the ocular arranged in line with the opening in the telescope body tube; and interposed between the primary prism 5 and the ocular 6 is a double reflecting prism 7 which we will call the secondary prism because it is second in order in the path of light. Each of these prisms is clamped to a base plate which together with the prism and its clamping device forms an integral unit and thus by properly seating, adjusting and securing the base plate the prism is easily adjusted and securely held in place. The strain on the prism itself, usual in previous instruments in which the prisms are adjustably mounted, is in this case eliminated because all movement of the prism is obtained through manipulation of the entire prism unit, that is, the prism together with its mounting and not through movement of the prism element alone.

Accordingly the primary prism 5 rests upon the base plate 8 with its front face resting against the ears 9 provided on the front end of the base plate. The housing 10 formed to snugly fit the prism, as is shown in Fig. 3, is placed over the prism and is secured to the base plate by means of the screws 11 passing through the flanges 12 formed one on each side of the housing. The primary prism and its mounting now forms an integral unit. This unit is placed in position over the opening 13 in the casing 3 and is secured in place by the screws 15 threaded into the casing. Four screws 14, passing through the flanges 12 but threaded through the base plate 8, provide legs upon which the prism unit rests and by means of which it is universally tilted. It is easily seen that a tightening of the screws 15 and 14 on one side of the mounting and a loosening of the corresponding screws 15 and 14 on the opposite side of the mounting will cause the prism unit to tilt in the direction of the tightened screws. Again, if either the front or rear pair of screws 14 and the two screws 15 be loosened while the opposite pair of screws 14 are tightened, a forward or backward tilting movement results.

The secondary prism is provided with a transverse sliding adjustment. The prism 7 is placed on the base plate 17 with its front face resting against the ears 18. The prism is secured to the base plate by means of the constraining members 19, the post members 20 and the strap 21. The constraining members 19 are each provided with elongated slots 22 through which a threaded shank on the end of each of the post members 20 passes. This allows the constraining members 19 sufficient play to allow for any deviation in the size or shape of the prism and allows movement for shifting the prism in order to more accurately locate it relatively to the base plate 17. The strap 21 carried by the posts 20 holds the prism 7 securely in place on the base plate 17 with its front face resting against the ears 18. This unitary mounting is secured to the casing 3 by means of the screws 23 passing through the slots 24 in the base plate 17. The posts or screws 25 provided one on each side of the base plate, provide bearing surfaces against which the adjusting screws 26 bear. For transverse adjustment of the prism unit the screws 23 are loosened, the adjusting screw 26 on the side toward which the unit is to be shifted is loosened and the opposite adjusting screw 26 bearing against the post 25 is tightened thus sliding the unit over until the opposite post 25 again bears against the loosened screw 26, the amount of shifting movement of the prism unit being governed by the amount of movement given the loosened adjusting screw.

In collimating the telescope a course adjustment of the optical system is provided by manipulation of the rotating objective prism head. A fine supplementary adjustment may then be obtained by manipulation of the various screws controlling the adjustment of either or both the primary and secondary prisms of the ocular prism system. In this way the combined adjusting facilities of the rotating head, the universal tilting adjustment of the primary ocular prism and the sliding or shifting transverse adjustment of the secondary ocular prism produces an accurate collimation of the telescope system that is both easily and quickly accomplished.

Having thus described my invention what I claim and desire to secure by Letters Patent in the United States is:

1. In an optical system for telescopes, the combination of a rotatable objective prism, of a single reflecting element universally tiltable relatively to said rotatable objective prism and a double reflecting element transversely adjustable relative to said single reflecting element and the eye piece of said telescope system.

2. In a telescope ocular prism system the combination of a single reflecting prism provided with a universal tilting adjustment, of a double reflecting prism provided with a transverse shifting adjustment relatively to said single reflecting prism.

3. A unitary prism mounting for telescope ocular prisms embodying a base plate provided at its forward edge with a pair of ears, a single reflecting prism seated on said base plate with its forward face resting against said ears, a housing adapted to fit said prism element and secured to said plate, means for securing said base plate to the ocular prism casing, and a plurality of leg members threaded through the base plate and resting against said prism casing and adapted to provide the prism unit with a tilting adjustment.

4. A unitary prism mounting for telescope ocular prisms embodying a base plate having a plurality of slots and provided at its forward edge with a plurality of ears, a double reflecting prism seated on said base plate with its forward face resting against said ears, a pair of angular constraining members having elongated slots therein, a pair of posts extending through the slots in said constraining members for adjustably securing them to the base plate, a strap carried by said posts for securing the prism to said base plate, and a post on each side of said base plate adapted to be engaged by a screw for transversely adjusting said prism unit.

ALBERT GREBE.